United States Patent
Watzke et al.

[11] Patent Number: 5,547,904
[45] Date of Patent: Aug. 20, 1996

[54] BOROSILICATE GLASS HAVING IMPROVED UV TRANSMISSION, THERMAL AND CHEMICAL PROPERITIES AND METHODS OF MAKING AND USING SAME

[75] Inventors: Eckhart Watzke; Thomas Kloss, both of Jena, Germany

[73] Assignee: Jenaer Glaswerk GmbH, Jena, Germany

[21] Appl. No.: 333,369

[22] Filed: Nov. 2, 1994

[30] Foreign Application Priority Data

Nov. 8, 1993 [DE] Germany ............ 43 38 128.6

[51] Int. Cl.$^6$ .................. C03C 3/091; C03C 3/11; C03C 4/00; C03C 4/08
[52] U.S. Cl. .................. 501/66; 501/56; 501/13; 501/905
[58] Field of Search .................. 501/66, 56, 13, 501/905

[56] References Cited

U.S. PATENT DOCUMENTS

| | | | |
|---|---|---|---|
| 3,994,708 | 11/1976 | von Reth et al. | 65/32 |
| 4,792,535 | 12/1988 | Fine | 501/66 |
| 4,870,034 | 9/1989 | Kiefer | 501/66 |
| 4,925,814 | 5/1990 | Fine | 501/66 |
| 5,045,509 | 9/1991 | Kiefer | 501/59 |

FOREIGN PATENT DOCUMENTS

| | | |
|---|---|---|
| 767476 | 12/1943 | Germany. |
| 3801840 | 5/1990 | Germany. |
| 4012288 | 7/1991 | Germany. |
| 60-21830 | 4/1985 | Japan. |
| 60-77144 | 5/1985 | Japan. |
| 9233741 | 3/1992 | Japan. |
| 2218086 | 8/1989 | United Kingdom. |

Primary Examiner—Mark L. Bell
Assistant Examiner—Louis M. Troilo
Attorney, Agent, or Firm—Michael J. Striker

[57] ABSTRACT

The borosilicate glass has a UV transmission of at least 80% at a UV wavelength of about 254 nm for a borosilicate glass sheet thickness of 2 mm, a linear coefficient of thermal expansion, $\alpha_{20/300}$, of 3.2 to 3.4×10$^{-6}$ K$^{-1}$, a hydrolytic resistance of class 1 and a composition in % by weight based on oxide of

| | |
|---|---|
| glass formers | <96%, |
| SiO$_2$ | from 79.0 to 81.0%, |
| B$_2$O$_3$ | from 12.5 to 13.0%, |
| Al$_2$O$_3$ | from 2.0 to 4.0%, |
| alkali metal oxides | >2%, | wherein said alkali metal oxides include from 2.0 to 3.5% said K$_2$O and from 1.0 to 2.0% said Li$_2$O,

| | |
|---|---|
| alkaline earth metal oxides + ZnO | <0.3%, |
| reducing agent | 0.025 to 2%, and |
| non-oxidizing fining agent | 0 to 3%. |

The weight ratio of K$_2$O to Li$_2$O is from 2:1 to 1:1 in the borosilicate glass. The glass is particularly suitable as a UV transparent material for EPROM windows, UV lamps, photomultipliers, spectrophotometers, particularly any of the foregoing used under particularly difficult climatic conditions, and as a protective tube for UV lamps immersed in water in waste water treatment plants, in UV oxidation reactors and/or solar reactors.

13 Claims, No Drawings

BOROSILICATE GLASS HAVING IMPROVED UV TRANSMISSION, THERMAL AND CHEMICAL PROPERITIES AND METHODS OF MAKING AND USING SAME

BACKGROUND OF THE INVENTION

The present invention relates to an improved borosilicate glass and, more particularly, borosilicate glass having a high transmission for electromagnetic radiation in the UV region, a small thermal expansion coefficient and a high chemical stability. It also relates to a method of making the improved borosilicate glass and a method of using it.

Glasses having high UV transparency have numerous applications. They are used, for example, as EPROM windows and UV glasses, as windows in photomultipliers and spectrophotometers, and as protective tubes of UV lamps in UV reactors.

UV oxidation reactors are used to decrease or eliminate pollutants from chemically and/or biologically contaminated water in the most varied manner or for sterilizing drinking water.

The oxidative degradation of chemical compounds such as chlorinated hydrocarbons, CFCs, AOX or BTX and the oxidative destruction of bacteria in water is promoted by UV radiation—principally at a wavelength 253.7 nm. A UV radiation protection tube, which can be universally used in all UV oxidation reactor types, must therefore, in addition to high UV transmission at 254 nm, have very good chemical stability since it is exposed to attack by aqueous solutions over a very long period and possibly at elevated temperature. Since the UV oxidation reactors can also be exposed to high temperature stresses in operation, the radiation protection tube must have as high as possible a resistance to temperature change which can be achieved by low thermal expansion.

Quartz glass is highly suitable for use per se as a UV-transparent glass, but because of its high price and processing difficulties it is only used in exceptional cases requiring particularly good hydrolytic properties. A further disadvantage with quartz glass is its poor fusibility to ceramic substrates (e.g. $Al_2O_3$), Ni—Fe—Co-alloys or molybdenum, because of a thermal expansion coefficient which is too small.

"Borosilicate glass 3.3", a borosilicate glass having minimum thermal expansion—with the highest possible chemical stability—and thus high resistance to temperature change is currently known and marketed.

Because of its small thermal expansion coefficient, $\alpha_{20/300}$, of $3.3 \times 10^{-6}$ $K^{-1}$ and its high chemical stability, this glass has assumed an outstanding position internationally, e.g. in the areas of laboratory equipment, chemical apparatus, piping, fittings and household glass.

It is traded under various brand names—such as Duran, Pyrex, Rasotherm and Simax and has a very similar chemical composition which is approximately (% by weight) $SiO_2$, 80 to 81%; $B_2O_3$, 12 to 13%; $Al_2O_3$, 2 to 3% and $Na_2O+K_2O$, 4 to 5%.

For Duran®, according to Laboratory Glass Catalog No. 50020/1991, the composition (in % by weight) below is given by the manufacturer as: $SiO_2$, 81%; $B_2O_3$, 13%; $Al_2O_3$, 2%; and $Na_2O+K_2O$, 4%.

However, "Borosilicate glass 3.3", because of its composition, has an insufficient UV transparency in the UV-B range of 280 to 315 nm. For wavelengths below approximately 300 nm, it is insufficiently transparent, even if the glass is produced with raw materials extremely low in $Fe_2O_3$.

In the past, it has apparently not been recognized in developmental work involving "Borosilicate glass 3.3" that it is possible to influence its structure-related insufficient UV transparency decisively by a specific structural change.

Thus, German Patent DE-C 767,476 long ago disclosed a borosilicate glass having the following composition: (in % by weight): from 72.5 to 83% $SiO_2+Al_2O_3$; from 0 to 15% $B_2O_3$; from 4 to 16% alkali metal oxides and alkaline earth metal oxides.

From U.S. Pat. No. 3,258,352, those skilled in the art know of a glass having the following composition (in mol. %)>75% $SiO_2+B_2O_3+Al_2O_3$; from 0 to 20% $Al_2O_3$; from 0 to 50% $B_2O_3$; from 0 to 20% $Li_2O+Na_2O+K_2O$; from 0 to 30% $MgO+CaO+SrO+BaO$; and from 0 to 20% PbO.

JP-B 92/33741 B2 teaches a glass having the following composition (in % by weight) from 68 to 82% $SiO_2$; from 0.5 to 5% $Al_2O_3$; from 10 to 18% $B_2O_3$; from 3.5 to 8% $Li_2O+Na_2O+K_2O$; from 0 to 3% $CaO+MgO$; and from 0.05 to 1% fining agent.

It cannot be inferred from the prior art that there is a borosilicate glass of the type "Borosilicate glass 3.3" having a high transmission in the UV region.

The only highly UV-transparent material with low thermal expansion and high chemical stability currently known is quartz glass or silica glass.

However, this single-component glass, as already mentioned at the outset, is very expensive and can be produced only with difficulty or not at all in complicated geometric dimensions and narrow tolerances.

SUMMARY OF THE INVENTION

It is an object of the present invention to provide a borosilicate glass of the type "Borosilicate glass 3.3", having similar properties of thermal expansion, viscosity, chemical stability, meltability and crystallization resistance, but which also has a high UV transmission of at least 80% at a wavelength of 254 nm for a 2 mm sheet thickness, which has a good to very good hydrolytic resistance of class 1 according to DIN 12 111, which has a linear thermal expansion coefficient, $\alpha_{20/300}$, of 3.2 to $3.4 \times 10^{-6}$ $K^{-1}$ and which can be produced stably, especially with respect to the good UV transparency, i.e. that slight changes in the reduction conditions for the iron (III) ion have no influence, or only an extremely small influence, on the UV transmission.

According to the invention this object is achieved by a borosilicate glass having a composition (in % by weight based on oxide)

| | |
|---|---|
| glass formers | <96 |
| $SiO_2 + B_2O_3 + Al_2O_3$ | <98 |
| alkali metal oxides | >2 |
| $K_2O:Li_2O$ | 2:1–1:1 |
| alkaline earth metal oxides + ZnO | <0.3 |
| reducing agent | 0.025 to 2 |
| non-oxidizing fining agent | 0 to 3. |

Surprisingly, it has been found that the known "borosilicate glass 3.3", by modifying its alkali metal oxide content, can be structurally changed so that a highly UV-transparent matrix results which makes possible UV transparencies of $\tau_{250\ nm/2\ mm} > 80\%$ and at the same time the special combination of properties of low thermal expansion and high chemical stability can be retained.

In borosilicate glasses, the UV transparency of the glass for a given impurity content of UV absorbers is determined by the ratio of $BO_3$ to $BO_4$ coordination groups.

High UV transparency requires a structure in which as many boron atoms as possible are present as $BO_3$ structural elements in Boroxol rings ($B_3O_6$).

Since some Raman spectroscopy studies established that only such a structure guarantees high UV transparency, it became apparent that attempts to improve the structure of "Borosilicate glass 3.3" should be made considering these findings.

Surprisingly, this type of structural optimization was possible by introducing defined amounts of $K_2O$ and $Li_2O$ at approximately unchanged contents of $SiO_2$, $B_2O_3$ and $Al_2O_3$. In laboratory tests, it was determined that the use of 2.0 to 3.5% by weight of $K_2O$ and 1.0 to 2.0% by weight of $Li_2O$, keeping the weight ratio of $K_2O$ to $Li_2O$ from about 2:1 to 1:1, results in a glass which, in its essential physico-chemical properties—including the improved UV transparency—approaches "Borosilicate glass 3.3".

The thermal expansion coefficient, $\alpha_{20/300}$, should be from 3.2 to $3.4 \times 10^{-6}$ $K^{-1}$ and the chemical stability, with the hydrolytic class 1 or acid class 1, likewise corresponds to "Borosilicate glass 3.3".

With respect to the melting and fining behavior, the viscosity at high temperatures, the crystallization stability and the processability, the glass according to the invention is likewise very similar to the comparison glass Duran®.

The borosilicate glass according to the invention therefore has a composition (in % by weight based on oxide) of from 79.0 to 81.0% $SiO_2$; from 12.5 to 13.0% $B_2O_3$; from 2.0 to 4.0% $Al_2O_3$; from 2.0 to 3.5% $K_2O$; from 1.0 to 2.0% $Li_2O$; from 0.025 to 2.0% reducing agent and from 0 to 3.0% non-oxidizing fining agent.

Studies have shown that it is necessary, in order to achieve very high UV transmission rates of $\tau_{250\ nm/2\ mm} > 80\%$, to use raw materials so low in iron that no more than approximately 5 ppm of $Fe_2O_3$ are contained in the glass.

All agents reducing $Fe^{3+}$ to $Fe^{2+}$ can be used as reducing agent.

In the laboratory melts in an air atmosphere in an electrically heated furnace, glasses according to the invention having the best UV transparencies resulted when metallic silicon was used as reducing agent. On the order of about 300 ppm of metallic silicon was used.

Each melting process requires a type and amount of reducing agent matched to the specific conditions.

Surprisingly, the redox potential necessary for the reduction of $Fe^{3+}$, because of the basicity of the glasses according to the invention, can relatively easily be kept constant. The high UV transparency, $\tau_{254\ nm/1\ mm}$, of up to 87/88%, which is sufficient for EPROM glasses, is relatively insensitive to deviations in melt technology.

On the one hand, an excess of reducing agents does not cause undesirable absorptions and, on the other hand, the reduced $Fe^{2+}$, despite access to air, can be kept at the desired valency.

This stability of high UV transparency represents a great advantage in comparison to other glasses.

The fining of the glass was carried out with chlorides, preferably with potassium chloride (KCl and in part with small amounts of sodium chloride, NaCl).

In the selection of fining agents, it must be noted that only non-oxidizing agents are used which, in addition, must also contain no UV absorbers, so that, e.g., no nitrates, sulfates, $As_2O_3$, $Sb_2O_3$ and $CeO_2$ can be used.

In Table 1, compositions of glasses according to the invention and the raw materials used for melting are listed.

The raw materials were used as quartz flour (trade name Sipur or Yotaquartz), boric acid, aluminium hydroxide, potassium carbonate, lithium carbonate and chlorides in very pure optical qualities having low $Fe_2O_3$ contents.

For melting, crucibles having a volume of approximately 1 liter and quartz glass stirrers were used. The melt temperatures in the electrically heated laboratory furnace were 1630°–1650° C., the melting time approximately 6–7 hours.

The melts were carried out in conventional manner in an air atmosphere, poured into molds and cooled in a stress-free manner.

In Table 2, important physicochemical properties of a glass according to the invention are compared with "Borosilicate glass 3.3" as exemplified by Duran® 8330.

It is clear that the glass according to the invention has identical or highly similar properties to Duran®, including the increased UV transparency.

In the comparison of UV transmission properties, glasses having similar levels of impurities absorbing in the UV range must be compared. For this reason, Duran® was produced on a laboratory scale using optical, i.e. very pure, low-iron raw materials, under the same conditions as the glass according to the invention, so that the precipitously increased UV transparency can actually be related to structural optimization of the glass.

The comparison in Table 2, moreover, shows that the glass according to the invention has lower viscosities so that it can be produced with lower energy and in better quality.

TABLE 1

Composition of glasses according to the invention

| Oxide | Glass 1 % by weight | Glass 2 % by weight | Raw materials |
|---|---|---|---|
| $SiO_2$ | 79.50 | 80.50 | Sipur/Yota |
| $B_2O_3$ | 12.70 | 12.70 | $H_3BO_3$ |
| $Al_2O_3$ | 3.40 | 2.40 | $Al(OH)_3$ |
| $K_2O$ | 1.40 | 2.0 | $K_2CO_3$ |
| $K_2O$ | 1.50 | — | KCl |
| $Li_2O$ | 1.50 | 1.50 | $Li_2CO_3$ |
| $Na_2O$ | — | 0.9 | NaCl |
| Si° | 0.03 | 0.03 | Si°, metallic |
| | 100.03 | 100.03 | |

TABLE 2

Physicochemical properties of glass according to the invention in comparison with Duran® 8330

| | Example 2 | Duran 8330 |
|---|---|---|
| $\alpha_{20/300}$ ($10^{-6}$ $K^{-1}$) | 3.3 | 3.25 |
| ρ (g/cm³) | 2.2 | 2.23 |
| $T_g$ (°C.) | 520 | 530 |
| $E_W$ (°C.) | 785 | 815 |
| $V_A$ (°C.) | 1250 | 1270 |
| Hydrolytic class DIN 12111, ISO 719 | 1 | 1 |
| Acid class DIN 12116, ISO 1776 | 1 | 1 |
| Alkali class | 3 | 2 |

TABLE 2-continued

Physicochemical properties of glass according to the
invention in comparison with Duran® 8330

|  | Example 2 | Duran 8330 |
|---|---|---|
| DIN 52322, ISO 675 |  |  |
| Crystallization range (°C.) | 680–1040 | 680–1030 |
| $CR_{max}$ (μm/h) | 40 | 40 |
| Transmission rates in % |  |  |
| (highly pure materials) |  |  |
| $\tau_{250\,nm\,2\,mm}$ | 86 | 30 |
| $\tau_{250\,nm\,10\,mm}$ | 63 | 10 |

While the invention has been illustrated and embodied in a borosilicate glass having a high transmission for electromagnetic radiation in the UV region, a small thermal expansion coefficient and a high chemical stability and a method of making and using it, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. Borosilicate glass having a high UV transmission, a small linear coefficient of thermal expansion, a high chemical stability, and a composition in % by weight based on oxide of

| glass formers | <96%, |
|---|---|
| $SiO_2$ | from 79.0 to 81.0%, |
| $B_2O_3$ | from 12.5 to 13.0%, |
| $Al_2O_3$ | from 2.0 to 4.0%, |
| alkali metal oxides | >2%, | wherein said alkali metal oxides include from 2.0 to 3.5% $K_2O$ and from 1.0 to 2.0% $Li_2O$,

| alkaline earth metal oxides + ZnO | <0.3%, |
|---|---|
| reducing agent | 0.025 to 2%, and |
| non-oxidizing fining agent | 0 to 3%; | and wherein a weight ratio of $K_2O$ to $Li_2O$ is from 2:1 to 1:1.

2. Borosilicate glass as defined in claim 1, further comprising up to 5 ppm of iron oxides.

3. Borosilicate glass as defined in claim 1, wherein said UV transmission is at least 80% at a UV wavelength of about 254 nm for a borosilicate glass sheet thickness of 2 mm and said linear coefficient of thermal expansion, $\alpha_{20/300}$, is from 3.2 to 3.4×10$^{-6}$ K$^{-1}$; and having a hydrolytic resistance of class 1 according to DIN 12 111.

4. Process for making a borosilicate glass having a composition in % by weight based on oxide of

| glass formers | <96%, |
|---|---|
| $SiO_2$ | from 79.0 to 81.0%, |
| $B_2O_3$ | from 12.5 to 13.0%, |
| $Al_2O_3$ | from 2.0 to 4.0%, |
| alkali metal oxides | >2%, | wherein said alkali metal oxides include from 2.0 to 3.5% $K_2O$ and from 1.0 to 2.0% $Li_2O$,

| alkaline earth metal oxides + ZnO | <0.3%, |
|---|---|
| reducing agent | 0.025 to 2%, and |
| non-oxidizing fining agent | 0 to 3%; | and wherein a ratio $K_2O$:$Li_2O$ is 2:1–1:1, said process comprising the steps of making a glass melt in air atmosphere in an electrically heated furnace and adding metallic silicon as at least a part of said reducing agent to said glass melt.

5. Process as defined in claim 4, wherein said composition of said borosilicate glass made by the process includes up to 5 ppm of iron oxides, and wherein said metallic silicon is added to said glass melt until about 300 ppm of said silicon is present in said glass melt as a reducing means for any $Fe^{+3}$ present in said iron oxides.

6. Process for making a borosilicate glass having a composition in % by weight based on oxide of from 79.0 to 81.0% $SiO_2$; from 12.5 to 13.0% $B_2O_3$; from 2.0 to 4.0% $Al_2O_3$; from 2.0 to 3.5% $K_2O$; from 1.0 to 2.0% $Li_2O$; from 0.025 to 2.0% reducing agent and from 0 to 3.0% non-oxidizing fining agent, said process comprising the steps of making a glass melt in air atmosphere in an electrically heated furnace and adding metallic silicon as an $Fe^{+3}$-reducing agent to said glass melt until said melt is about 300 ppm silicon.

7. In a UV lamp comprising a UV-transparent glass, the improvement wherein said glass is a borosilicate glass having a high UV transmission, a small linear coefficient of thermal expansion, a high chemical stability, and a composition in % by weight based on oxide of

| glass formers | <96%, |
|---|---|
| $SiO_2$ | from 79.0 to 81.0%, |
| $B_2O_3$ | from 12.5 to 13.0%, |
| $Al_2O_3$ | from 2.0 to 4.0%, |
| alkali metal oxides | >2%, | wherein said alkali metal oxides include from 2.0 to 3.5% $K_2O$ and from 1.0 to 2.0% $Li_2O$,

| alkaline earth metal oxides + ZnO | <0.3 %, |
|---|---|
| reducing agent | 0.025 to 2%, and |
| non-oxidizing fining agent | 0 to 3%; | and wherein a weight ratio of $K_2O$ to $Li_2O$ is from 2:1 to 1:1.

8. In a protective tube comprising a UV-transparent glass, the improvement wherein said glass is a borosilicate glass having a high UV transmission, a small linear coefficient of thermal expansion, a high chemical stability, and a composition in % by weight based on oxide of

| glass formers | <96%, |
|---|---|
| $SiO_2$ | from 79.0 to 81.0%, |
| $B_2O_3$ | from 12.5 to 13.0%, |
| $Al_2O_3$ | from 2.0 to 4.0%, |
| alkali metal oxides | >2%, | wherein said alkali metal oxides include from 2.0 to 3.5% $K_2O$ and from 1.0 to 2.0% $Li_2O$,

| | |
|---|---|
| alkaline earth metal oxides + ZnO | <0.3 %, |
| reducing agent | 0.025 to 2%, and |
| non-oxidizing fining agent | 0 to 3%; | and wherein a weight ratio of $K_2O$ to $Li_2O$ is from 2:1 to 1:1.

9. In an EPROM window comprising a UV-transparent glass, the improvement wherein said glass is a borosilicate glass having a high UV transmission, a small linear coefficient of thermal expansion, a high chemical stability, and a composition in % by weight based on oxide of

| | |
|---|---|
| glass formers | <96%, |
| $SiO_2$ | from 79.0 to 81.0%, |
| $B_2O_3$ | from 12.5 to 13.0%, |
| $Al_2O_3$ | from 2.0 to 4.0%, |
| alkali metal oxides | >2%, | wherein said alkali metal oxides include from 2.0 to 3.5% $K_2O$ and from 1.0 to 2.0% $Li_2O$,

| | |
|---|---|
| alkaline earth metal oxides + ZnO | <0.3 %, |
| reducing agent | 0.025 to 2%, and |
| non-oxidizing fining agent | 0 to 3%; | and wherein a weight ratio of $K_2O$ to $Li_2O$ is from 2:1 to 1:1.

10. In a photomultiplier comprising a UV-transparent glass, the improvement wherein said glass is a borosilicate glass having a high UV transmission, a small linear coefficient of thermal expansion, a high chemical stability, and a composition in % by weight based on oxide of

| | |
|---|---|
| glass formers | <96%, |
| $SiO_2$ | from 79.0 to 81.0%, |
| $B_2O_3$ | from 12.5 to 13.0%, |
| $Al_2O_3$ | from 2.0 to 4.0%, |
| alkali metal oxides | >2%, | wherein said alkali metal oxides include from 2.0 to 3.5% $K_2O$ and from 1.0 to 2.0% $Li_2O$,

| | |
|---|---|
| alkaline earth metal oxides + ZnO | <0.3 %, |
| reducing agent | 0.025 to 2%, and |
| non-oxidizing fining agent | 0 to 3%; | and wherein a weight ratio of $K_2O$ to $Li_2O$ is from 2:1 to 1:1.

11. In a spectrophotometer comprising a UV-transparent glass, the improvement wherein said glass is a borosilicate glass having a high UV transmission, a small linear coefficient of thermal expansion, a high chemical stability, and a composition in % by weight based on oxide of

| | |
|---|---|
| glass formers | <96%, |
| $SiO_2$ | from 79.0 to 81.0%, |
| $B_2O_3$ | from 12.5 to 13.0%, |
| $Al_2O_3$ | from 2.0 to 4.0%, |
| alkali metal oxides | >2%, | wherein said alkali metal oxides include from 2.0 to 3.5% $K_2O$ and from 1.0 to 2.0% $Li_2O$,

| | |
|---|---|
| alkaline earth metal oxides + ZnO | <0.3 %, |
| reducing agent | 0.025 to 2%, and |
| non-oxidizing fining agent | 0 to 3%; | and wherein a weight ratio of $K_2O$ to $Li_2O$ is from 2:1 to 1:1.

12. In a solar reactor comprising a UV-transparent glass, the improvement wherein said glass is a borosilicate glass having a high UV transmission, a small linear coefficient of thermal expansion, a high chemical stability, and a composition in % by weight based on oxide of

| | |
|---|---|
| glass formers | <96%, |
| $SiO_2$ | from 79.0 to 81.0%, |
| $B_2O_3$ | from 12.5 to 13.0%, |
| $Al_2O_3$ | from 2.0 to 4.0%, |
| alkali metal oxides | >2%, | wherein said alkali metal oxides include from 2.0 to 3.5% $K_2O$ and from 1.0 to 2.0% $Li_2O$,

| | |
|---|---|
| alkaline earth metal oxides + ZnO | <0.3%, |
| reducing agent | 0.025 to 2%, and |
| non-oxidizing fining agent | 0 to 3%; | and wherein a weight ratio of $K_2O$ to $Li_2O$ is from 2:1 to 1:1.

13. In an apparatus containing a UV-transparent glass, the improvement wherein said UV-transparent glass is a borosilicate glass having a high UV transmission, a small linear coefficient of thermal expansion, a high chemical stability, and a composition in % by weight based on oxide of

| | |
|---|---|
| glass formers | <96%, |
| $SiO_2$ | from 79.0 to 81.0%, |
| $B_2O_3$ | from 12.5 to 13.0%, |
| $Al_2O_3$ | from 2.0 to 4.0%, |
| alkali metal oxides | >2%, | wherein said alkali metal oxides include from 2.0 to 3.5% $K_2O$ and from 1.0 to 2.0% $Li_2O$,

| | |
|---|---|
| alkaline earth metal oxides + ZnO | <0.3%, |
| reducing agent | 0.025 to 2%, and |
| non-oxidizing fining agent | 0 to 3%; | and wherein a weight ratio of $K_2O$ to $Li_2O$ is from 2:1 to 1:1.

* * * * *